Nov. 25, 1952     O. REDLICH     2,619,280
CENTRIFUGAL CONTACTOR AND METHOD OF CONTACTING
Filed Oct. 25, 1948     3 Sheets-Sheet 1

Inventor:
Otto Redlich
By Oswald H. Milmore
His Attorney

Nov. 25, 1952     O. REDLICH     2,619,280
CENTRIFUGAL CONTACTOR AND METHOD OF CONTACTING
Filed Oct. 25, 1948     3 Sheets-Sheet 2

Inventor:
Otto Redlich
By Oswald H. Milmore
His Attorney

Nov. 25, 1952     O. REDLICH     2,619,280
CENTRIFUGAL CONTACTOR AND METHOD OF CONTACTING
Filed Oct. 25, 1948     3 Sheets-Sheet 3
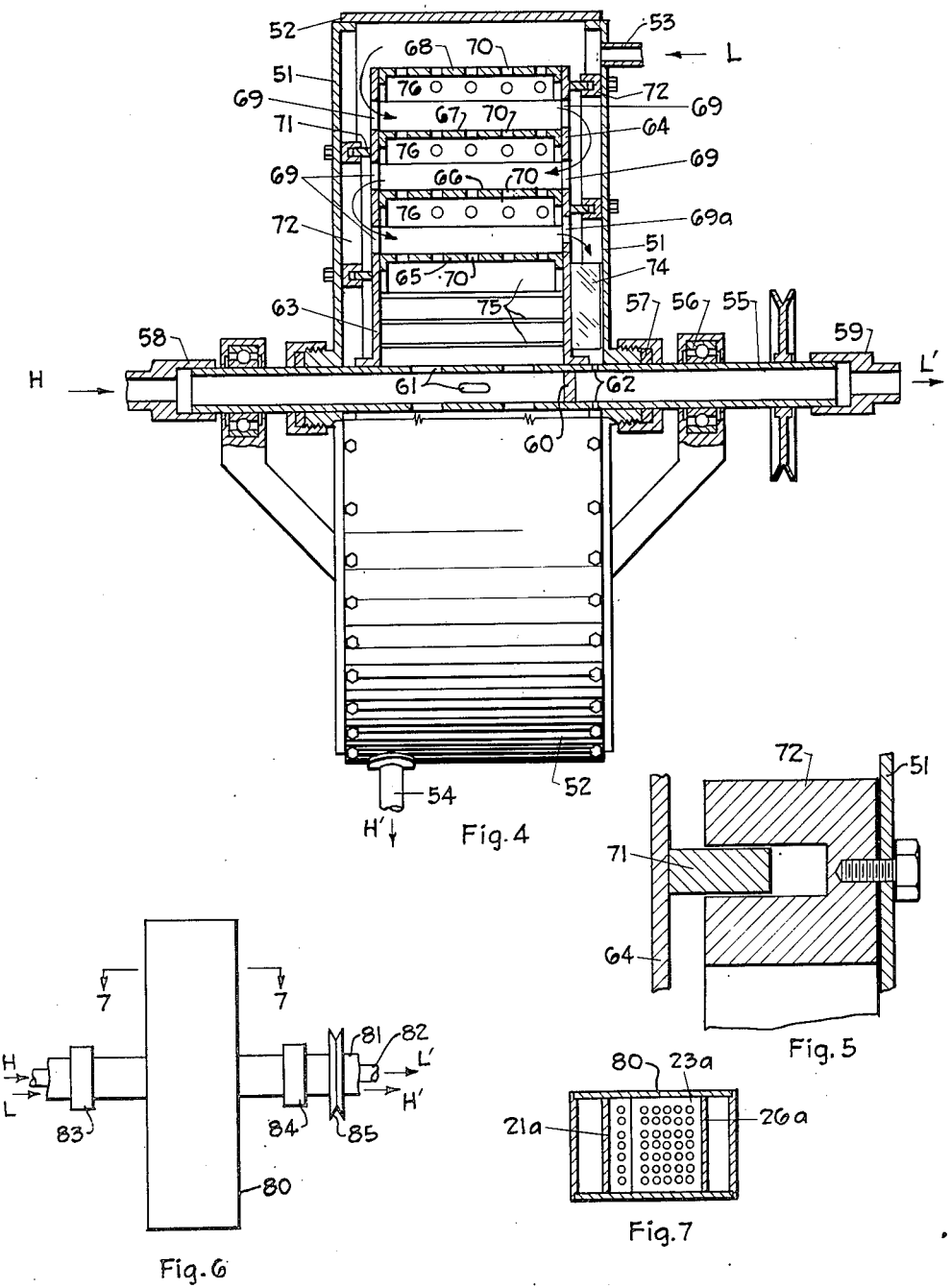
Inventor:
Otto Redlich
By: Oswald H. Milmore
His Attorney Patented Nov. 25, 1952

2,619,280

UNITED STATES PATENT OFFICE 2,619,280

CENTRIFUGAL CONTACTOR AND METHOD OF CONTACTING

Otto Redlich, Berkeley, Calif., assignor to Shell Development Company, San Francisco, Calif., a corporation of Delaware Application October 25, 1948, Serial No. 56,293

20 Claims. (Cl. 233—15)

This invention relates to an improved apparatus and method for intimately contacting at least partially immiscible fluids, and is applicable, for example, in the washing and extraction arts, such as the solvent refining of hydrocarbon oils. Either fluid, or both of them, may be pure substances, or they may consist of fluid mixtures, some of the components of which may be normally solid or normally gaseous substances dissolved in a liquid. More particularly, the invention is concerned with a centrifugal contactor and with a contacting method wherein one of the fluids is dispersed into the other liquid and subsequently disengaged therefrom, the dispersing and disengaging operations being induced or aided by centrifugal force.

In liquid-liquid solvent extraction and analogous processes it has heretofore been proposed to disperse one of two at least partially immiscible liquids in the other so as to improve the rate and degree of desired transfer of one or more substances from one of the liquids to the other by forcing the liquid to be dispersed through small openings or perforations in a perforated plate. To achieve this, the two liquids are maintained on opposites of the perforated plate and one of the liquids is made to flow through the perforations by moving the perforated plate or by applying differential pressure to the liquids, as by a pump. The liquid flowing through the perforations is subdivided into a large number of fine streams, which enter the other liquid with a velocity sufficient to achieve appreciable penetration. In the course of such penetration the streams break up into small droplets, resulting in a dispersion. Excellent contact and transfer of solutes between liquids results because of the kinetic energy of the entering stream and the resulting droplets. An example of such a dispersion system is described in U. S. Patent No. 2,011,186 to van Dijck. Van Dijck proposed double dispersion (wherein a first liquid is dispersed into the second liquid during part of the cycle, and the second liquid is dispersed into the first liquid during another part of the cycle), as distinguished from a single dispersion as contemplated in the instant invention. The dispersion produced in such a system is passed into a settling or disengaging section or stage, which is normally a gravity settler wherein the dispersed liquid is coalesced and separated from the dispersing liquid.

A difficulty with such dispersion extraction or contacting systems has been the relatively low rate of throughput, which is often limited by the capacity of the settlers or disengaging stages, particularly when liquids differing but slightly in specific gravities are contacted. It is, of course, possible to expedite disengagement by providing centrifugal separators, but this requires complex and expensive pipes, valves, and connections and a large number of such centrifugal separators with separate drive mechanism, particularly when the liquids flow in countercurrent, i. e., pass through a series of alternate dispersing and disengaging stages.

Another aspect of the difficulty encountered with such dispersion extraction or contacting systems is the insufficient rate of flow of the liquid dispersed through the perforations. With greater flow velocities equilibrium regarding the transfer of substances from one liquid to the other is approached more rapidly than with lower velocities. However, in large apparatus involving a plurality of countercurrent stages only a limited pressure can be imposed at each partition if undue pressures at the end stages are to be avoided. To provide additional pumps intermediate the column is a theoretically possible solution, but is not practicable because of the expense inherent in such a complex arrangement.

Higher rates of flow of the fluids in such apparatus are, however, very desirable because it is thereby possible to achieve a far greater throughput for a piece of equipment of a given size, and/or to handle the same amount of fluids with smaller equipment.

It has also been proposed to effect solvent extraction by counterflowing two liquids through flow channels arranged spirally or in zig-zag fashion in a rotor which is rotated on a horizontal or vertical axis. An example of such a system is disclosed by Thayer in U. S. Patent No. 2,176,983. Thayer achieved simple countercurrent flow through elongated flow passage tending generally from a rotor axis toward the periphery through which the liquids of different densities were made to flow; the flow was promoted by spinning the rotor, whereby the denser liquid was induced to move away from the rotor axis, while the lighter liquid flowed radially inwardly. This device, however, did not insure dispersion of one liquid in the other.

It is an object of the invention to provide an improved contactor and contacting method involving dispersion of one fluid in another wherein the dispersion and disengaging operations are aided by centrifugal force.

Another object is to improve the operation of dispersion type contacting operations by increasing the rate of flow through a counter-current dispersion contacting apparatus through the use of a centrifugal device which causes the fluid to be dispersed to flow through the perforations of a partition and into the other fluid by centrifugal force, and which, further, causes the fluid so dispersed to be disengaged from its dispersion by centrifugal force. By "disengaged" is meant the collection of the dispersed droplets into a continuous phase. As a consequence, the fluid to be dispersed can be made to flow through the perforations at a satisfactorily high velocity and the speed of disengagement of the fluids can be increased by rotating the centrifugal device at a higher speed. Since this has the effect of magnifying the influence of density differences between the fluids, it becomes possible to treat fluids differing only slightly in densities, which could not be treated in dispersing contactors heretofore without recourse to separate centrifuges.

A further object is to provide an improved contactor comprising a rotor having a plurality of perforated partitions disposed at progressively different distances from the axis of rotation, e. g., concentrically about the rotor axis, or substantially so, and provided with flow passageways arranged to cause the fluids to collect in bodies on opposite sides of the partitions and to form disengaging spaces or zones intermediate the partitions, and to cause at least one of the liquids to flow through the perforations and to be dispersed in the other liquid the rotor being rotated to induce the flow of liquids and to hasten the disengaging action.

Other objects pertaining to the specific construction and arrangement of parts will be apparent from the following description, taken in connection with the drawings forming a part of this specification and illustrating certain preferred embodiments of the invention, wherein:

Figs. 3 and 4 are fragmentary sectional views corresponding to Fig. 1 of two modified forms of the apparatus;

Fig. 5 is an enlarged cross-sectional view of one of the annular seals employed in Fig. 4;

Fig. 6 is an elevational view of a further modified form of the apparatus; and

Fig. 7 is a sectional view taken on line 7—7 of Fig. 6.

Figure 1:
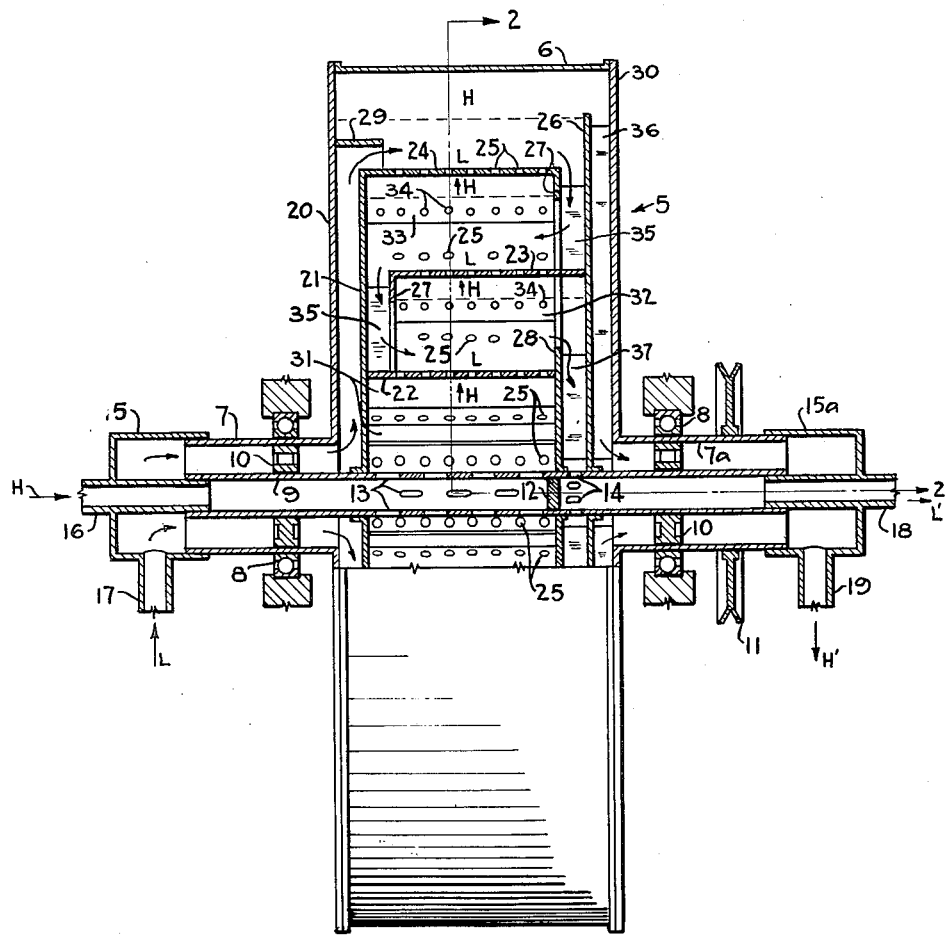
Fig. 1 is a vertical sectional view, partly in elevation, through a centrifugal contactor or extractor in accordance with the invention.

Briefly, the improved method of contacting two at least partially immiscible fluids comprises the steps of feeding the relatively lighter fluid to a radially outer portion of a contact apparatus, such as a rotor, and the relatively heavier fluid to a radially inner portion of the apparatus while rotating the fluids about an axis, e. g., by spinning the rotor, the apparatus having a plurality of perforated partitions intermediate said radially outer and inner portions spaced apart to define intervening spaces that provide a quiet region adjacent one partition and a flow region adjacent the other partition; maintaining a body of the relatively lighter fluid on the radially outer side of each perforated partition and a body of relatively heavier fluid on the radially inner side of each perforated partition; and effecting countercurrent flow of the fluids wherein the fluid retained in each quiet region is flowing through the perforations to form small droplets which are dispersed in the fluid flowing in the flow region on the other side of the partition, the latter fluid moving as a stream substantially parallel to the faces of said partitions and wherein the resulting dispersed phase is disengaged, i. e., wherein the dispersed droplets are collected in a continuous phase in the quiet region of the same intervening space as that containing the dispersion, by centrifugal force. The contacted liquids are separately withdrawn from the apparatus after disengagement.

The foregoing steps can be carried out in a variety of apparatus, four preferred embodiments of which are described in detail. The essential features of the apparatus according to the invention are a rotor provided with or cooperating with perforated partitions at different distances from the rotor axis, e. g., concentric cylindrical screens or perforated plates, or flat or spiral screens or perforated plates, spaced apart to provide disengaging zones between adjacent partitions; flow connections for feeding raw relatively less dense fluid to a feed point at a radially outer part of the rotor and the raw relatively denser fluid to a feed point at a radially inner part of the rotor; flow connections for discharging contacted relatively less dense fluid from a discharge point at a radially inner part of the rotor and the relatively denser fluid from a discharge point at a radially outer part of the rotor; passageways permitting at least one of the fluids (hereinafter referred to as the first fluid) to flow within the rotor from its feed point to its discharge point while traversing, in succession, one side of each perforated partition; and means for retaining a body of the other fluid (hereinafter referred to as the second fluid) on each perforated partition on the opposite side. In such an apparatus, when the rotor is spun and the raw fluids are fed under sufficient pressure to their respective feed points the second fluid will be induced to flow through the perforations of the partitions into the body of the first fluid to form a dispersion, and will be disengaged from the first fluid by centrifugal force. The disengaged second fluid then passes by centrifugal force into the body of second fluid retained against the next partition in its direction of flow, while the first fluid traverses the next partition in its direction of flow, it being understood that general or overall directions of flow are opposite. The directions of flow of the fluids at their points of contact are, however, mutually perpendicular, because the first fluid traverses the partitions by flow parallel to the partitions, while the second fluid flows more or less perpendicular to the partitions.

The rotor consists of the rotatable elements of the apparatus. The number of elements which make the rotor may be varied: the rotor must, as a minimum, have suitable structure such as baffles, paddles, etc., for imparting to the fluids an angular velocity about the rotor axis to effect the desired dispersion of one fluid through the perforated partitions and the subsequent disengagement thereof from the resulting dispersion and it is not essential that the perforated partitions themselves or the outer casing for the rotor rotate. However, for simplicity of construction it is preferred to mount the perforated partitions on the rotor to form a part thereof. On the other hand, all elements of the apparatus, including the casing, may rotate.

The configuration of the apparatus and of the perforated partitions is subject to wide variation. In general, axial symmetry about the rotor axis is desirable, but not in every case essential. According to a preferred embodiment the rotor is constructed as a body of revolution, i. e., the perforated partitions are substantially cylindrical and concentric with the rotor axis, giving to the apparatus a drum-like shape. Since the partitions nearer to the rotor axis have progressively smaller circumferences, they may be made progressively longer in the direction of the axis if equal areas for the several stages are desired. On the other hand, the apparatus may take the form of a column of any suitable, e. g., rectangular, cross-sectional shape, the column being supported for rotation about an axis at its midpoint, as shown in Figs. 6 and 7, thereby providing partitions of equal sizes and lengths in the direction of the axis.

The method according to this invention provides a simple and efficient operation whereby satisfactory countercurrent contacting may be effected within a unitary, compact and simple apparatus, compared with equipment which was necessary heretofore. It is, of course, possible to operate a plurality of such contactors in parallel to increase the capacity, and/or in series to increase the number of "stages," it being understood that one contactor, although forming a single physical stage, operates as a number of theoretical treating stages.

Figure 2:
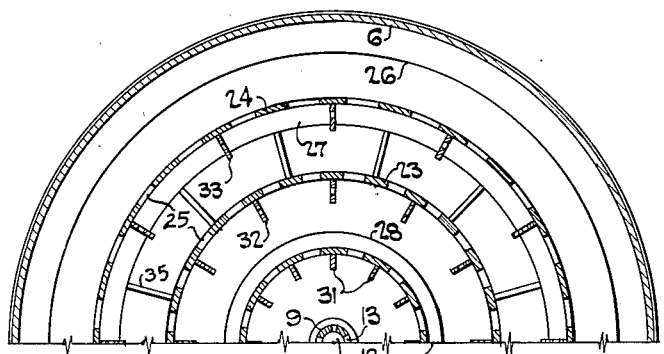
Fig. 2 is a partial sectional view taken on section line 2—2 of Fig. 1.

Referring to Figs. 1 and 2 of the drawings, the contactor comprises a drum-like rotor 5 having an outer cylindrical wall 6 and having tubular shafts 7 and 7a at its axis. The rotor is supported from any suitable stationary support, not shown, through bearings 8. A smaller tube 9 is mounted within shafts 7 and 7a, and rigidly secured thereto by axially perforated rings 10. The rotor may be rotated by any suitable means, such as through a pulley 11 fixed to the shaft 7a. The tube 9 is obstructed near one side of the rotor by a fixed, imperforate partition 12, and provided with perforations 13 and 14 on the left and right sides of the partition. Stationary couplers 15 and 15a are mounted at the ends of the rotor shafts and have running seals therewith; they may be provided with sealing and packing means of any approved type, not shown. Coupler 15 has pipes 16 and 17 through which denser and less dense fluids H and L, respectively, may be introduced into the system for contacting. The heavier fluid H flows from the pipe 16 through tube 9 and radially outward through the holes 13, while the lighter fluid L flows from the pipe 17 through the annular space within tubular shaft 7 and surrounding tube 9, radially outward in the space between radial walls 20 and 21 of the rotor.

The rotor is provided with a plurality of perforated partitions at different distances from the rotor axis. While these partitions may be of various shapes, e. g., polygonal or frusto-conical, and may have their axes disposed somewhat off-center with respect to the rotor axis, it is preferred to provide substantially cylindrical partitions mounted concentrically with respect to the rotor axis. Any number of such partitions, from one to as many as ten or more, may be used, each partition corresponding to one extraction stage. In the simple, illustrative embodiment shown in the drawing three such partitions are shown, indicated at 22, 23 and 24. These partitions are provided with a plurality of small holes 25. The sizes of the holes will depend in part upon the nature of the liquids, particularly their viscosities and density difference, and the speed of rotation of the rotor. Thus, the partitions may be formed of sheet metal or wire screens; when greater strength is required and larger holes are necessary, the partitions are made of metal plates through which slots or circular holes of suitable diameters, e. g., from $1/64$ in. to $1/4$ in., are punched. It will be understood that the number of holes in practice exceeds the number indicated on the drawing.

As shown in Fig. 1, alternate partitions 22 and 24 are secured to the left inner wall 21, and intermediate partitions, such as the partition 23, the right inner wall 26. All partitions except the radially innermost partition 22 carry inwardly directed flanges at their free ends, indicated at 27, leaving a flow space between said flanges and the adjacent wall. The term "free end" is herein used to indicate the end which is not sealed to one of the inner walls, without connoting that the free end may not have some structural support connecting it to the adjacent wall. These flanges form dams projecting from the inner faces of the partitions and constitute means for retaining a body of heavy fluid H on the side of each perforated partition nearer the holes 13 of tube 9, which form the feed point for the heavier fluid. The annular regions on the inner faces of the partitions, out to distances corresponding to the inner edges of the dams, are quiet regions for the retention of heavier fluid; the remaining part of the spaces between the partitions are flow regions for the flow of the lighter fluid. It is possible and in some cases desirable to provide the quiet regions by making the partitions slightly conical, making the radius of the free end of each partition slightly less than its sealed end. This will facilitate the axial flow of the lighter fluid across the partitions, as will be described hereinafter. This conicity may be very small, e. g., of that order of 1° to 4°, and is, therefore, too slight to be shown on the drawings. With such a conicity the flanges 27 may be omitted; in this case the portion of the partition near the free end constitutes the means for retaining a body of heavy fluid on its inner side. A partial wall 28 extends radially outwardly from tube 9 to beyond the innermost partition 22. An annular baffle 29 may optionally be provided on the outer wall 20.

As is evident from the arrangement shown, the pipe 18 in the coupler 15a is in flow communication with the tube 9, and treated or contacted light fluid L' may be discharged therethrough after flowing through the space between walls 26 and 28 and through the holes 14. Similarly, contacted heavy liquid H' may be discharged by flow between the inner wall 26 and the outer wall 30, thence through the annular space within tubular shaft 7a and surrounding tube 9, and, finally, through the pipe 19.

In using the device relatively lighter and heavier fluids, such as hydrocarbon oil and a selective solvent for aromatic constituents therefor, e. g., phenol, nitrobenzene, furfural, are introduced through the pipes 16 and 17 and the rotor 5 is spun at any desired speed, such as between 200 and 3,000 R. P. M. The heavier fluid fills the tube 9 to the left of the partition 12 and also the space surrounding this tube within the partition 22. The lighter fluid flows into the rotor at a radially outer part, beyond the partition 24. Since the heavier fluid tends to displace the lighter fluid toward the periphery, and vice versa, the two fluids tend to flow countercurrently within the rotor.

After the rotor has been in operation some time and equilibrium has been established, a body of heavy fluid H will be retained in the quiet region on the radially inner face of each perforated partition, being restrained against axial flow by the flanges 27. The extents of these bodies are indicated approximately by dotted lines in Fig. 1. There being no corresponding flanges on the radially outer faces of the partitions, the lighter fluid L will traverse the flow regions on the outer faces of the partitions in a generally axial direction indicated by the arrows. As a result there will be a body of fluid L on one side and a body of fluid H on the other side of each partition. Due to the centrifugal force incident to the rotation of the rotor the fluid H will flow radially outwardly through the perforations 25 and small droplets of H will be dispersed within the adjacent body of L, thereby effecting intimate contact. In other words, the bodies of fluid L near the partitions do not consist of pure L, but are dispersions wherein H is the dispersed phase. The bodies H, on the other hand, consist of substantially pure H.

The contactor can also be constructed without positive means for retaining the body of heavy fluid H on the inner faces of the partitions by relying on the motion of the lighter fluid L to prevent the escape of appreciable quantities of the heavy fluid H around the free ends of the partitions. Such action is, however, not always reliable, and it is preferred to provide the flanges 27 and/or to give the partitions a slight conicity, as described above.

The dispersed droplets of H continue to flow radially outwardly, impelled by centrifugal force, thereby effecting further contacting and a rapid disengagement from fluid L. The disengaged droplets of H coalesce and collect in the zones indicated by dotted lines and marked H in Fig. 1. Little, if any, of the dispersed fluid H is entrained by the main stream of fluid L flowing radially inwardly between the flanges 27 and the adjacent inner rotor walls, and such amounts as are entrained are merely recycled into the preceding body of fluid H, causing no objectionable results. However, if dispersed droplets of fluid H were to be entrained by the stream of fluid L entering the holes 14 it would adversely affect the purity of the product L'. To prevent or minimize such entrainment the partial wall 28 preferably extends beyond the partition 22, permitting only a stream of fluid L which is removed some distance from the partition (and wherein, therefore, the droplets of fluid H have coalesced to a greater extent and have a greater flow velocity relative to the dispersing fluid L) to be discharged. The relatively larger drops of fluid H which are unavoidably entrained are in most cases readily disengaged in the space between walls 26 and 28. When complete disengagement is not effected within this space the final stream L' may be passed to an after-settler or centrifuge. It is, of course, also possible to operate without extending the wall 28 radially outwardly beyond the partition 22.

It will be noted that the inner wall 26 extends radially into the outermost body of fluid H. In this manner the withdrawal of fluid L through the pipe 19 is prevented. The depth of this outermost body of fluid H is controlled by regulating the rate of fluid discharge through the pipe 19.

It is necessary, for the proper operation of the apparatus according to this embodiment in the manner described above, that the pressure of the heavy fluid H on the radially inner side of each perforated partition be greater than the pressure of the lighter fluid L on the opposite side. The relative pressures are dependent not only upon the densities of the fluids but also upon their angular velocities and distances from the axis of rotation. In nearly every case, the angular velocities of the fluids will differ from the angular velocity of the rotor because fluid tends to rotate at an angular velocity such as to maintain a constant moment of momentum. Fluid moving radially outwardly undergoes a decrease in angular velocity, and fluid moving radially inwardly undergoes an increase in angular velocity unless acted upon by some rotational force. Fluid friction against the rotor is such a rotational force and tends to make the angular velocity of the fluid equal to that of the rotor. Fluid friction will in many cases cause the fluids to assume angular velocities about the rotor axis to permit the successful operation of the apparatus in the form described up to this point; this would occur, for example, when high viscosity fluids are treated, and/or when the fluids differ greatly in densities, and/or the radial distance between the innermost and outermost partitions 22 and 24 is a small proportion of the radius to the partitions, and/or when the rotor is operated at relatively low speeds.

In most instances, however, fluid friction is insufficient and it is necessary to provide baffles or other irregularities to insure the proper angular velocity. Thus, without using baffles, in most situations the heavy liquid H within the innermost partition 22 would, with reasonably large rates of throughput, rotae at an angular velocity considerably less than that of the partition 22 and light fluid L on the opposite side of the same partition, and the pressure of the heavy fluid could in such a case be less than that of the light fluid. To build up the angular velocity and, thereby, the pressure of the heavier fluid, it is preferred to provide radial baffles 31 on the inner face of the innermost partition 22. After emergence of the heavy fluid through the perforations, its angular velocity is influenced by that of the light fluid within which it is dispersed, resulting in angular velocities great enough to cause rapid disengagement and subsequent dispersion of the collected heavy fluid through subsequent partitions. However, it is in some cases desirable to provide, in addition to the baffles 31, similar baffles 32 and 33 on the inner side of the other partitions. These baffles are also in the form of radial ribs and may be extended radially inwardly from the partitions to any desired distance (permissibly even to the next partition) and may optionally be provided with perforations 34.

Instead of, or in conjunction with the baffles 32 and 33 for accelerating the angular velocity of the heavy fluid H, the angular velocity of the light fluid L may be reduced in the course of its radially inward flow by providing radial baffles 35 between the free ends of the partitions and the adjacent walls of the rotor. These baffles preferably extend radially inwardly to the next partition, as shown. These baffles decrease the pressure of the lighter fluid due to centrifugal force and thereby facilitate the flow of the heavy fluid through the perforations.

For reducing the power required to spin the rotor, radial baffles 36 may be provided between the walls 26 and 30, and radial baffles 37 may be mounted between walls 26 and 28. By reducing the speed of rotation of the fluids these radial baffles impart angular momentum to the rotor. The discharge of the treated fluids L' and H' is also facilitated by such a reduction in their angular velocities. Similar radial baffles could be installed between the walls 20 and 21 for accelerating the rotation of the light fluid; however, a high angular velocity for the light liquid L is not usually necessary, and in most instances fluid friction will carry the light liquid along sufficiently to permit facile disengagement of the dispersion outside of the outermost partition 24. For this reason such baffles are not shown in Fig. 1; they appear, however, at 47 in Fig. 3.

Figure 3:
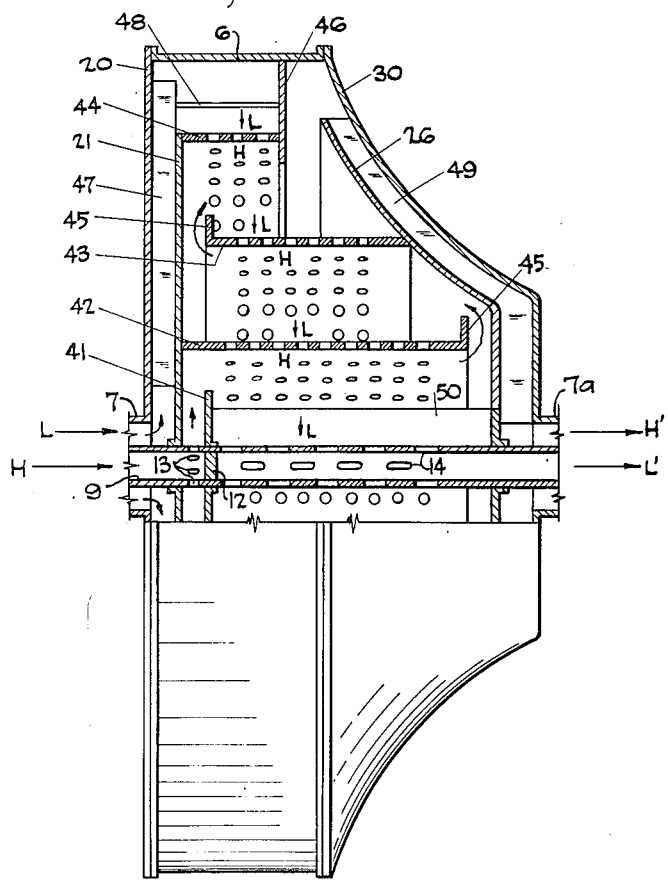

As was indicated heretofore, the apparatus may be arranged to permit either of the fluids to be dispersed, or even to permit one of the fluids to be dispersed in one part of the rotor, and to cause the second fluid to be dispersed in the former fluid in another part of the column. Fig. 3 illustrates an embodiment wherein the lighter fluid L is in each stage dispersed within the heavier fluid H. In this case the rotor comprises walls 6, 20, 21, 26 and 30 as in Fig. 1, and is similarly journalled through tubular shafts 7 and 7a, containing an inner tube 9, having holes 13 and 14. In this case, however, the imperforate partition 12 is near the left of intake side of the rotor, and heavy fluid H supplied through the tube 9 flows radially outwardly between wall 21 and a partial wall 41. The perforated partitions 42, 43 and 44 are arranged to have alternate free ends and each partition except the outermost partition 44 is provided with a flange 45 which extend radially outwardly. In this embodiment the quiet region is on the radially outer side of each perforated partition to the edge of the respective flange 45 and the flow region is radially outward from the quiet region of the same space. The outermost partition 44 is sealed at both ends, the end away from the wall 21 being sealed to the outer wall 6 by an annular wall 46. This wall may, if desired, extend radially inwardly from the partition 44 as shown to minimize entrainment of droplets of fluid L in the discharging stream of fluid H. If the partitions are made frusto-conical, the free ends are made slightly larger than the sealed ends. In this embodiment the partitions near to the axis of rotation are progressively longer, so that all partitions have equal areas.

Radial baffles 47 are optionally provided in the space between walls 20 and 21 to impart an angular velocity to the light fluid L. Radial ribs 48 on the outer face of the outer partition 44 and/or 43 may supplement the baffles 47.

The operation of the device shown in Fig. 3 is similar to that previously described. After equilibrium has been established bodies or pockets of lighter fluid L collect in the quiet regions on the outer faces of the several partitions, being retained by the flanges 45. A stream of fluid H will traverse the flow regions at the radially inner faces of these partitions in a generally axial direction indicated by the arrows. As a result there will be bodies of different fluids on opposite faces of the partitions, and the fluid L will pass through the perforations in the partitions and be dispersed within fluid H, and be disengaged therefrom in the course of its radially inward flow. Treated lighter fluid L' is withdrawn through the holes 14 and tube 9, and treated heavier fluid H' is withdrawn from around edge of wall 26 through the annular space within shaft 7a and surrounding the tube 9.

Baffles 47 or 48 are necessary in most instances, but may be omitted in those special situations previously indicated wherein baffles 31 may be omitted in the embodiment according to Figs. 1 and 2. Radial baffles 49 between the walls 26 and 30 and ribs 50 surrounding the tube 9 may optionally be provided to reduce the angular velocity of the outflowing fluids, thereby facilitating discharge and conserving rotational momentum. Baffles between the flanges 45 and the adjacent walls (corresponding to baffles 35 in Fig. 1) are not usually necessary in this embodiment, although they can be provided.

In the embodiment according to Figs. 4 and 5, the apparatus comprises a stationary housing 51 of any suitable outline, with removable cover plates 52, containing the rotor, to be described. The housing has, near the top, an inlet 53 for the light fluid L to be contacted, and, near the bottom, an outlet 54 for the discharge of the contacted heavy fluid H'. The rotor comprises a tube 55 and parts rotatable therewith. This rotor is mounted for rotation by supporting the tube 55 within the casing by bearings 56 and sealing it by running seals 57. Stationary couplers 58 and 59 are sealed to tube 55, and provide, respectively, an inlet for the heavy fluid H and an outlet for the contacted light fluid L'. An imperforate partition 60 near one side of the casing obstructs the tube 55, which has perforations 61 and 62 on the left and right sides of the obstruction. The tube 55 has rigidly mounted thereon and rotatable with it a frame for supporting cylindrical perforated partitions. The frame work may comprise two circular transverse plates 63 and 64 secured to the tube 55 to which the partitions 65, 66, 67 and 68 are secured. Arcuate slots or holes 69 are cut into the plates 63 and 64 at different radial distances from the rotor axis to be opposite the spaces between adjacent partitions. These slots are preferably near to the outer face of each partition (with the exception noted hereafter), there being a plurality, e. g., four to twelve, of such slots for each end of each partition arranged circumferentially at each radial distance leaving between the slots only as much wall structure as is necessary for structural reasons. A quiet region is thereby formed adjacent the inner face of each perforated partition to a distance from the partition corresponding to the radially outer edge of each hole 69; the remaining part of each space between adjacent partitions, adjacent the outer face of each perforated partition, is the flow region. The slot 69a at the discharge end of the innermost partition 65 is spaced slightly radially out from the partition to provide an annular dam having the function previously described for the partial wall 28 in Fig. 1. Each partition has a plurality of perforations 70.

A plurality of annular running seals of any type are provided between the side walls of casing 51 and each of the transverse rotor plates 63 and 64 adjacent thereto, successive seals being of diameters corresponding approximately to the diameters of the perforated partitions, but alternated at the right and left sides to provide a staggered pattern. Thus, there are separate running seals for alternate intervals between radially adjacent slots 69 on each plate, but the seals for plate 63 are at intervals intermediate to the intervals at which seals are provided at plate 64. In the embodiment illustrated, the labyrinth seals are used; they comprise rings 71 secured to and rotatable with the plate 63 or 64 of the rotor, and running in stationary guides 72 secured to the side walls of the casing by bolts. The rings may be made of soft metal capable of insuring a seal by light frictional contact. By this arrangement the light fluid L will traverse the perforated partitions along the course indicated by the arrows. Thus, upon entry through the pipe 53, it will traverse partition 68 toward the left, flow radially inwardly at the left of plate 63 and toward the right through the outermost slots 69 therein. It then traverses the partition 67, flowing out through the outermost slots 69 in plate 64, then radially inwardly at the right of plate 64, and toward the left through the next set of slots 69 in plate 64 onto partition 66. It is eventually discharged through the slots 69a, holes 62 and coupler 59. Radial baffles 74 may optionally be secured to the plate 64 to rotate therewith.

Ribs or baffles 75 are mounted within the cylindrical partition 65 to impart rotational motion to the heavy fluid H supplied through the coupler 58, tube 55 and holes 61. Similar baffles 76 may be provided for the other partitions to prevent slippage of the heavy fluid H.

The operation of the device just described is similar to that previously described for Figs. 1 and 2. Bodies of heavy fluid H collect on the inner faces of each of the perforated partitions and are dispersed through the perforations 70 into the traversing light fluid L and then disengaged therefrom by centrifugal force. The advantages of this embodiment over the previously described forms are: (1) Windows for observation of the contacting and pipes for sampling fluids in various places can be more readily provided. (2) Pumping is required only for the lighter fluid. (3) The construction of the rotating elements is somewhat simpler. The disadvantage of this embodiment is the necessity of providing running seals 71 to prevent short circuiting of the light fluid.

Figs. 6 and 7 illustrate an embodiment wherein the rotor is not cylindrical about its axis, but comprises an elongated column 80 of rectangular outline mounted for rotation about a pair of concentric tubes 81 and 82 having their axes at the midpoint of the column and perpendicular to the column axis, so as to maintain axial symmetry. The tubes are journalled in bearings 83 and rotated by a pulley 85. Fluids are fed onto and withdrawn from these tubes in the manner described for Fig. 1. The column is provided with walls 21a and 26a, extending transversely to the axis of rotation and corresponding to the walls 21 and 26 of Fig. 1. The column is, further, provided with a plurality of transverse perforated rectangular partitions alternately connected to the walls 21a and 26a. Only the partition 23a appears in Fig. 7. The partitions are provided with flanges corresponding to flanges 27, and with a partial wall, corresponding to wall 28, and the tubes are provided with an obstruction and with ports corresponding to the obstruction 12 and ports 13 and 14 of the embodiment according to Figs. 1 and 2. Since a longitudinal sectional view through the column would appear exactly like Fig. 1 (with the omission of the baffles 31–33, and 35–37, inclusive, which are not needed in this embodiment), Fig. 1 may be taken to represent such a sectional view.

The operation of the column according to Figs. 6 and 7 is like that according to Figs. 1 and 2. Baffles for regulating the angular motion of the fluids are not necessary because the fluids are constrained by the walls of the column 80 to rotate at the same angular speed as the rotor, said walls forming positive means for rotating the fluids about the axis of rotation.

I claim as my invention:

1. The method of contacting two at least partially immiscible liquids of different densities comprising the steps of feeding the relatively less dense liquid to a radially outer portion of a contact apparatus having a plurality of spaces located at different radii from an axis of rotation and separated by perforated partitions having small perforations distributed over the area thereof, each of said spaces including a flow region adjoining one partition and a quiet region adjoining the other partition, said partitions being situated at different distances from said axis and providing passageways larger than said perforations interconnecting said flow regions in a series; feeding the relatively denser liquid to a radially inner portion of said apparatus; rotating the liquid in said spaces about said axis; maintaining in one of said regions on the radially inner side of each perforated partition by centrifugal force a body of denser liquid to an appreciable depth measured in a radial direction; maintaining in the other of said regions on the radially outer side of each perforated partition by centrifugal force a body of less dense liquid to an appreciable depth measured in a radial direction; flowing the said bodies of one liquid successively through said flow regions in a stream that, in each space, flows over the perforated area of the respective adjacent partition substantially parallel to the partition essentially without passage through the said small perforations and, after traversing the said area of one partition, flows through one of said larger passageways onto a succeeding perforated partition; flowing the said bodies of the other liquid from the quiet regions through the small perforations of the respective partitions adjacent thereto in a multitude of small streams distributed over the areas of the partitions into said stream of the said one liquid to form a dispersion in the flow region on the opposite side of each partition; disengaging the dispersed disengaged liquid from each of the resulting dispersions and coalescing the second liquid within the adjoining quiet space by centrifugal force; discharging contacted less dense liquid from a space at a radially inner portion of the apparatus; and discharging contacted relatively denser liquid from a radially outer space of the apparatus.

2. The method according to claim 1 wherein the said one liquid is the relatively less dense liquid and the said other, relatively denser liquid is flowed successively through the small perforations in a radially outward direction.

3. The method according to claim 1 wherein the said other liquid is the relatively less dense liquid and is flowed successively through the small perforations in a radially inward direction.

4. The method of contacting two at least partially immiscible liquids of different densities comprising the steps of feeding the relatively less dense liquid to a radially outer portion of a rotor and the relatively denser liquid to a radially inner portion of said rotor, the rotor having a plurality of perforated partitions with small perforations distributed over the areas thereof and situated intermediate said radially inner and outer portions of the rotor at different radii from the rotor axis, said partitions being spaced apart radially to provide between each pair of partitions a flow region and a quiet region adjoining the respective partitions and affording larger passageways interconnecting the flow regions serially; rotating said rotor and the liquids about said axis; maintaining a body of denser liquid having appreciable radial depth in one of said regions on the radially inner side of each perforated partition by centrifugal force; maintaining a body of less dense liquid having appreciable radial depth in the other of said regions on the radially outer side of each partition by centrifugal force; flowing one of said liquids successively through said flow regions and larger passageways, the flow through said regions being substantially parallel to the respective adjacent partitions and essentially at constant distances from said rotor axis; flowing the other of said liquids from the several quiet regions through each of said perforated partitions in a multitude of small streams distributed over the area of the respective partition into the moving bodies of other liquid on the other sides of said partitions to form a dispersion in the flow region adjacent to each partition; and collecting and coalescing the dispersed liquid from each of said dispersions within the adjoining quiet region by centrifugal force.

5. Apparatus for contacting two at least partially immiscible liquids of different densities comprising, in combination: a series of partitions located at different radial distances from an axis of rotation and spaced apart to define a series of intervening spaces, each space providing a flow region for one liquid adjacent one partition thereof and a quiet region adjoining the other partition thereof, each partition having a liquid supply zone and a liquid discharge zone for the said liquid in the flow region thereof, said zones of each partition being spaced apart, and a plurality of small perforations distributed over the area of the partition between said supply and discharge zones thereof; means for supplying raw, relatively less dense liquid to a feed point adjoining a radially outer partition; means for supplying raw, relatively denser liquid to a feed point adjoining a radially inner partition; means for discharging contacted, relatively denser liquid from a discharge point adjoining a radially outer partition; means for discharging contacted, relatively less dense liquid from a discharge point adjoining a radially inner partition; flow communication means other than said perforations connecting the discharge zone of each partition to the supply zone of the next partition in said series, thereby interconnecting the said flow regions of the intervening spaces in series and providing a flow passageway for said one liquid that traverses each of said flow regions in succession and extends parallel to each perforated area; means for retaining a body of the liquid other than said one liquid of appreciable radial depth against each partition in the quiet region thereof, said quiet region being on the side thereof toward the feed point for the said other liquid; and means rotatable about said axis of rotation for imparting rotary movement about said axis of rotation at least to the said other liquid to induce passage thereof through the small perforations in the partition and radially into said one liquid that flows on the opposite sides of the respective partitions parallel to the partitions, whereby said other liquid is dispersed in said one liquid in each flow region and is thereafter disengaged therefrom and coalesced in each quiet region to form the body of said other liquid retained against the next partition.

6. Apparatus for contacting two at least partially immiscible liquids of different densities comprising, in combination: a rotor mounted for rotation about an axis and having rotatable therewith a series of partitions located at different radial distances from said axis and spaced apart to define a series of intervening spaces, each space providing a flow region for the flow of the one liquid adjacent one partition thereof and a quiet region adjoining the other partition thereof, each partition having a liquid supply zone and a liquid discharge zone for the said one liquid in the flow region thereof, said zones of each partition being spaced apart and situated at approximately the same radial distance from said axis, and a plurality of small perforations distributed over the area of the partition between said supply and discharge zones thereof; means for supplying raw, relatively less dense liquid to a feed point adjoining a radially outer partition; means for supplying raw, relatively denser liquid to a feed point near a radially inner partition; means for discharging contacted, relatively denser liquid from a discharge point adjoining a radially outer partition; means for discharging contacted, relatively less dense liquid from a discharge point adjoining a radially inner partition; flow communication means other than said small perforations connecting the discharge zone of each partition to the supply zone of the next partition in said series, thereby interconnecting the said flow regions of the intervening spaces in series and providing a flow passageway for said one liquid that traverses each of said flow regions in succession and extends parallel to each perforated area; means for retaining a body of the other liquid of appreciable radial depth against each partition in the quiet region thereof, said quiet region being on the side thereof toward the feed point for the said other liquid and confining the said other liquid to pass from each of said bodies thereof through the perforations and as small streams into the stream of said one liquid that flows on the opposite sides of the respective partitions parallel to the partitions when the rotor is rotated about said axis, whereby said other liquid is dispersed in the said one liquid in each flow region and is thereafter disengaged therefrom and coalesced in each quiet region to form the body of said other liquid retained against the next partition.

7. The apparatus according to claim 6 wherein the means for retaining a body of the said other liquid on the sides of said partitions comprises a dam for each partition projecting from the face thereof toward the said supply point for the said other fluid and the said flow passageway for the said one liquid is situated adjacent said dam.

8. In combination with an apparatus as set forth in claim 6, wherein the said one liquid is relatively less dense than the said other liquid, baffles on the radially inner sides of the partitions for reducing circumferential slippage between said other, denser liquid and the rotor and imparting rotary movement to said other liquid.

9. In combination with an apparatus as set forth in claim 6, wherein the said one liquid is relatively denser than the said other liquid, positive means for imparting rotary movement to the said other, less dense liquid supplied to the feed point outside said radially outer partition.

10. The apparatus according to claim 6 wherein the rotor is constructed as a body of revolution and the partitions extend substantially concentrically about said rotor axis.

11. An apparatus according to claim 6 wherein said flow communication means includes a housing enclosing said partitions and mounted for rotation therewith, said apparatus has a tubular axis at the rotor axis, and the said means for supplying liquids to said feed points and the said means for discharging liquids from said discharge points comprises conduits extending through said tubular supporting axle.

12. An apparatus according to claim 6 wherein said flow communication means includes a stationary housing enclosing said partitions, and the said means for supplying the relatively less dense liquid and said means for discharging the relatively denser liquid are conduits connected to said stationary housing.

13. Apparatus for contacting two at least partially immiscible liquids of different densities comprising, in combination: an axle journalled for rotation; spaced walls extending transversely from said axle; a plurality of substantially cylindrical partitions of different diameters between said walls and at different radial distances from the axis of said axle, said partitions being rotatable with said axle and radially spaced to define intervening spaces providing a flow region for the flow of one liquid adjacent one partition and a quiet region adjacent the other partition, each flow region having a liquid supply zone and a liquid discharge zone for the said one liquid spaced apart along the respective partition, said partitions having a plurality of small perforations distributed over the area of the partition between said supply and discharge zones; flow communication means other than said small perforations interconnecting the discharge zone of each flow region to the supply zone of the next flow region, thereby interconnecting the said flow regions in series and providing a flow passageway for said one fluid that traverses each of said spaces in succession and extends parallel to each perforated area; means for supplying raw, relatively denser liquid to a feed point inside of a radially inner partition; means for supplying raw, relatively less dense liquid to a feed point outside a radially outer partition; means for discharging contacted, relatively denser liquid from a discharge point near a radially outer partition; means for discharging contacted, relatively less dense liquid from a discharge point near a radially inner partition; and means for retaining a body of the liquid other than said first liquid to an appreciable radial depth in each quiet region, said quiet regions being located on the side of each partition toward the feed point for said other fluid, thereby confining the said other liquid to flow successively through the small perforations as small streams into flowing bodies of said one liquid in said flow regions to form dispersions therein, whereby said dispersed other liquid is thereafter disengaged from each dispersion and coalesced in the quiet region of the same intevening space by centrifugal force when the axle and partitions are rotated.

14. Apparatus for contacting two at least partially immiscible liquids of different densities comprising, in combination: a rotor having an axle journalled for rotation; spaced walls extending transversely from said axle; a plurality of substantially cylindrical partitions of different diameters situated between said walls and concentric with the axis of said axle, rotatable with and forming a part of said rotor, said partitions being radially spaced to define intervening spaces providing a flow region for the flow of one liquid adjacent one partition and a quiet region adjacent the other partition, said partitions having small perforations distributed over the respective areas thereof, alternate partitions being sealed to one wall and having free ends spaced from the other of said walls and intermediate partitions being sealed to the said other wall and having free ends spaced from the first-mentioned wall, thereby providing a communicating passageway at each of said free ends interconnecting the flow regions of the several spaces in series along a sinuous path that extends parallel to each perforated partition for the flow of the said one liquid along the faces of said partitions; means for supplying raw, relatively denser liquid to a feed point inside of a radially inner partition; means for supplying raw, relatively less dense liquid to a point outside of a radially outer partition; means for discharging contacted, relatively denser liquid from a discharge point near a radially outer partition; means for discharging contacted, relatively less dense liquid from a discharge point near a radially inner partition; and means for retaining a body of the liquid other than said first liquid to an appreciable radial depth in each quiet region, said quiet region being on the side of each partition toward the feed point for said other liquid, thereby confining the said other liquid to flow successively through the small perforations as small streams into flowing bodies of said one liquid in said flow regions to form a dispersion in each flow region, whereby said dispersed other liquid is thereafter disengaged from the dispersion and coalesced in the quiet region in the same intervening space by centrifugal force and the rotor is rotated.

15. In combination with the apparatus according to claim 14, baffle means for at least one of said partitions on the side thereof toward the feed point for said other liquid for reducing circumferential slippage of said other liquid with respect to the rotor.

16. Apparatus according to claim 14 wherein the said spaced walls are rotatable with and form a part of the rotor, and the said means for supplying liquid to said feed points and the said means for discharging liquids from said discharge points comprises conduits extending through said axle.

17. Apparatus according to claim 14 wherein the said spaced walls are stationary and each partition has a circular running seal between the end thereof that is sealed to a wall and the latter wall.

18. Apparatus for contacting two at least partially immiscible liquids of different densities comprising, in combination: a rotor having an axle journalled for rotation; spaced outer walls extending transversely from said axle and rotatable therewith; inner walls extending transversely from said axle and rotatable therewith, said inner walls being spaced from the outer walls to provide flow passages connecting radially inner and outer parts of the rotor; a plurality of substantially cylindrical partitions of different diameters and concentric with the axis of said axle situated between and rotatable with said inner walls, said partitions being spaced apart radially to define intervening annular spaces, said partitions having small perforations distributed over the respective areas thereof, alternate partitions extending to one inner wall and having free ends spaced from the other inner wall and intermediate partitions extending to the said other inner wall and having free ends spaced from the first-mentioned inner wall, thereby providing a communicating passageway at each of said free ends interconnecting the several intervening spaces in series for the flow of one liquid along a sinuous path that extends parallel to each perforated partition; means including a flow passage through said axle for supplying raw, relatively denser liquid to a feed point inside of a radially inner partition; means including one of said flow passages between an inner and an outer wall for supplying raw, relatively less dense liquid to a point outside of a radially outer partition; means including the other of said flow passages between an inner and an outer wall for discharging contacted, relatively denser liquid from a discharge point near a radially outer partition; means including a flow passage through said axle for discharging contacted, relatively less dense liquid from a discharge point near a radially inner partition; and an annular dam at the free end of each perforated partition and spaced from the nearby inner wall extending from the respective partition for a part of the radial distance to the next partition in the direction of the feed point for liquid other than said first liquid and forming with the said respective partition a quiet region occupying an annular part of the respective intervening space for the retention of a body of said other liquid to an appreciable depth, the remaining part of each intervening space forming a flow region for the flow of said one liquid over the surfaces of the perforated partitions toward the feed point for said one liquid, whereby said other liquid retained in said quiet regions is constrained to flow through said small perforations into currents of said one liquid in said flow regions to form a dispersion in each flow region and the dispersed liquid is thereafter disengaged from the dispersion and coalesced in the quiet region in same intervening space by centrifugal force when the rotor is rotated.

19. Apparatus for contacting two at least partially immiscible liquids of different densities comprising, in combination: a closed, stationary housing having side walls; a rotor within said housing having an axle and a frame with transverse rotor plates rotatable therewith, said plates being spaced from the side walls of said housing; a plurality of substantially cylindrical, concentric partitions of different diameters and concentric with the axis of said axle connecting said transverse rotor plates, said partitions being radially spaced to define intervening spaces providing a flow region for the flow of one liquid adjacent one partition and a quiet region adjacent the other partition for the retention of the other liquid, said partitions having small perforations distributed over the respective areas thereof; openings in said rotor plates at different radial distances affording communication between said flow regions and the spaces between the rotor plates and the nearby stationary side walls of the housing; an annular running seal between one of said rotor plates and the nearby side wall at each alternate interval between openings in the plate to successive flow regions; an annular running seal between the other of said rotor plates and the nearby side wall at each alternate interval between openings in the plate to successive flow regions, the running seals of the latter plate being staggered radially with respect to the running seals of the former plate, thereby providing a sinuous passageway for the flow of said one liquid that traverses said flow regions in succession and extends parallel to each perforated partition; means for supplying raw, relatively denser liquid to a feed point inside of a radially inner partition; means for supplying raw, relatively less dense liquid to a feed point outside said partitions; means for discharging contacted, relatively denser liquid from a discharge point outside of said partitions; means for discharging contacted, relatively less dense liquid from a discharge point near a radially inner partition; and means for retaining a body of the said other liquid within each quiet region against flow through said openings in the rotor plates, thereby confining the second liquid to flow successively through the small perforations as small streams into currents of said one liquid to form a dispersion in each flow region, whereby said dispersed liquid is thereafter disengaged from the dispersion and coalesced in the quiet region in the same intervening space by centrifugal force when the rotor is rotated.

20. The apparatus according to claim 19 wherein the openings in the transverse rotor plates are located some distance away from the partitions in the direction toward the said feed point for the said other liquid, whereby the said rotor plates provide radial dams that constitute the said means for retaining the body of said other liquid within the respective quiet regions.

OTTO REDLICH.

REFERENCES CITED

The following references are of record in the file of this patent:

UNITED STATES PATENTS

| Number | Name | Date |
| --- | --- | --- |
| 1,429,320 | Bouillon | Sept. 19, 1922 |
| 2,036,924 | Coulor | Apr. 7, 1936 |
| 2,172,222 | Podbielniak | Sept. 5, 1939 |
| 2,176,982 | Thayer | Oct. 24, 1939 |
| 2,189,230 | Sheldon | Feb. 6, 1940 |
| 2,209,577 | Podbielniak | July 30, 1940 |
| 2,234,921 | Webb | Mar. 11, 1941 |
| 2,281,616 | Placek | May 5, 1942 |
| 2,286,157 | Podbielniak | June 9, 1942 |
| 2,291,849 | Tomlinson | Aug. 4, 1942 |
| 2,313,541 | Flowers | Mar. 9, 1943 |